United States Patent [19]

Miller

[11] 4,048,030
[45] Sept. 13, 1977

[54] ELECTROLYTIC CELL FOR TREATMENT OF WATER

[76] Inventor: Jorge Miller, 8341 Noham 156, Germany

[21] Appl. No.: 627,192

[22] Filed: Oct. 30, 1975

[30] Foreign Application Priority Data

July 16, 1975 Germany .............................. 2531850

[51] Int. Cl.² .......................... C02B 1/82; C02C 5/12
[52] U.S. Cl. ................................... 204/149; 204/1 R; 204/257
[58] Field of Search ............... 204/149, 151, 152, 257, 204/272, 268, 131, 130, 1 R

[56] References Cited

U.S. PATENT DOCUMENTS

| 2,563,903 | 8/1951 | Zadra .................................... 204/272 |
| 3,457,152 | 7/1969 | Maloney, Jr. et al. ............... 204/131 |
| 3,716,459 | 2/1973 | Salter et al. .......................... 204/1 R |
| 3,730,885 | 5/1973 | Makrides et al. ...................... 210/30 |
| 3,755,114 | 8/1973 | Tarjanyi et al. ..................... 204/114 |
| 3,761,383 | 9/1973 | Backhurst et al. .................... 204/268 |
| 3,764,499 | 10/1973 | Okubo et al. .......................... 204/151 |
| 3,766,034 | 10/1973 | Veltman ................................ 204/149 |

Primary Examiner—Arthur C. Prescott
Attorney, Agent, or Firm—Stevens, Davis, Miller & Mosher

[57] ABSTRACT

The specification describes an electrolytic cell for the treatment of water, comprising a closed container with a lower inlet opening and an upper outlet opening for the water and a cathode and an anode. In the interior of the electrolytic cell particles are located whose density is higher than that of water and which are prevented from leaving the electrolytic cell by gratings adjacent to the inlet and the outlet.

1 Claim, 5 Drawing Figures

ELECTROLYTIC CELL FOR TREATMENT OF WATER

BACKGROUND OF THE INVENTION

1. Field to which invention relates

The invention relates to an electrolytic cell for the treatment of water, more particularly for the purification of water; it relates in particular to a multi-pole electrolytic cell, which can be used in the most varied fashions for the treatment, and more particularly for the purification of water and comprises a closed container with a lower inlet opening and an upper outlet opening for the water and at least two electrodes, which are adapted to be connected with the positive and the negative pole of a DC source.

2. The prior art

The most varied types of electrolytic methods for the treatment, and more particularly the purification of water, particularly the preparation of drinking water, have been proposed. With these known methods it is possible to remove the dissolved and suspended contaminating materials comprised in the water to be treated or purified electrolytically. This is generally carried out using an electrolytic cell in such a manner that consumable aluminum or iron electrodes are used to supply aluminum or iron ions to the water and which under the conditions of electrolysis form aluminum hydroxide and, respectively, iron hydroxide, which is flocculated out and entrains with it the contaminating materials present in the water by adsorption or inclusion. In this manner it is not only possible to remove the solids comprised in the contaminated water but it is also possible to remove dissolved contaminating substances and any discoloration which may be present.

In order to kill any micro-organisms which may be present in the contaminated water it is possible to add silver or copper ions to the water by making use of consumable silver or copper electrodes in order to bring about the death of the undesired germs. It is also possible to disinfect water for private and public swimming baths, and more particularly water for drinking purposes by adding disinfecting chemicals or producing electrolytically elementary chlorine or ozone or, respectively, per-compounds within the water to be disinfected.

A feature possessed by all the above described methods for cleaning and disinfection of water, more particularly of drinking water is that they are very complicated as regards the apparatus required and are also expensive and are extremely liable to breakdown. Thus, for example, in the case of the use of consumable aluminum, iron, copper or silver electrodes, for the introduction of aluminum, iron, copper or silver ions into the water to be treated, there is the disadvantage that the metal electrodes used for this purposed have to be cleaned or even completely replaced after only a few hours of operation, because a coherent oxide film (oxide crust) is formed on a surface and which interferes with further electrolytic treatment of the water. Thus, for example, in the case of the use of an aluminum anode the aluminum oxide film insulates the surface of the anode from the surroundings so that higher and higher voltages for electrolysis are necessary and which lead to the formation of more and more oxygen instead of aluminum ions. In the case of the use of an iron anode an iron oxide film coating is also formed within a few hours. This film is admittedly a comparatively good electrical conductor but further electrolysis takes place more and more on the iron oxide film surface with the formation of more and more oxygen instead of iron ions. In the case of the use of a copper or silver anode there is also the formation of an undesired oxide film coating, which prevents the formation of copper and silver ions during electrolysis.

Apart from the above mentioned difficulties in the case of previously used electrolytic cells there are the additional disadvantages that the electrodes, which are generally arranged parallel to each other, are completely unevenly consumed and used up so that the operation of the electrolytic cell is interfered with even long before the electrodes are completely consumed. Furthermore, in the case of previously proposed electrolytic cells there is an undesired corrosion, more particularly at the positions at which the electrodes are fixed and are electrically connected with the external current source.

SUMMARY OF THE INVENTION

One aim of the invention is therefore that of creating an improved electrolytic cell, in the case of which the above described disadvantages do not occur and with those help it is possible to treat contaminated water in a technically simple and economic manner continuously without interruptions electrolytically, that is to say to clean the water, to soften it and to disinfect it.

It has now been found that this aim can be attained by an electrolytic cell, which is provided with a lower opening for the supply of the water to be treated and an upper opening for the outlet of the water treated, in which the electrodes are arranged radially with respect to the center of the cell, in which the electrodes are connected by means of titanium strips attached to spot welding, silver soldering or riveting, or by means of titanium spring pressure contact with the external current source and in that in the interior of the electrolytic cell particles are provided, whose density is higher than that of the water and which are caused to eddy by the inflowing water with the formation of an eddying layer or fluidised bed, which owing to impingement and friction of the individual particles on the electrodes on the one hand brings about mechanical cleaning of the electrodes and on the other hand improves the electrical conductivity of the water to be treated, more particularly if it is a question of porous particles and preferably spherical particles whose pores are filled at least partly by an ion exchanger resin.

The subject matter of the invention is an electrolytic cell for the treatment of water, which comprises a closed container with a lower inlet opening and an upper outlet opening for the water and at least two electrodes which are adapted to be connected with the positive and with the negative pole of a DC source, characterized in that in the interior of the electrolytic cell particles are located whose density is higher than that of water and which are prevented by gratings, which are arranged in front of the lower water inlet openings and the upper water outlet opening and whose grating openings are smaller than the diameter of the particles in the interior of the electrolytic cell, from emerging from the electrolytic cell.

With the help of the electrolytic cell forming the subject matter of the invention it is possible to carry out methods normally carried out in water treatment and water purification systems, as for example the introduction of a flocculating agent into the water for absorbing and coagulation of all contaminating materials suspended and dissolved in it, the oxidation of the water for destruction of dissolved and suspended organic and inorganic reducing agents, disinfection and, respectively, sterilisation of water by the introduction or production of chlorine, silver ions (copper ions) and nascent oxygen (per-compounds) and reduction in water hardness, more particularly of the temporary hardness (lime hardness) down to any desired degree of hardness, in a technically simple economic but nevertheless extremely effective manner.

The electrolytic cell forming the subject matter of the invention preferably is of symmetrical construction and consists of a cylindrical tubular container whose upper and lower openings are closed by mating, conical lids in a liquid-tight manner, which respectively in their centers are provided with a connection for a water supply and water removal tubes and have on their mutually opposite sides a respective grating or sieve. In the center of this cell there is a solid or grid-shaped tube, whose length corresponds to the distance between the two gratings and between the tubular container and its upper lid and its lower lid seals are provided. Between the upper lid and the tubular container or between the lower lid and the tubular container or between the two of them there is furthermore a contact ring, also placed in seals, with molded-in contacts or spring pressure contacts, preferably titanium spring contacts, with whose help it is possible to produce the electrical connection between the electrodes arranged in the interior of the cell and the outer DC source. In order to set the distance between the two grids the tubular container can have corresponding marks as well on its inner wall.

The tube arranged in the center of the electrolytic cell can be closed at its upper and lower ends or can be open at these positions and it can be empty or can have a centrally arranged tubular electrode. In the case of a preferred form of the invention the electrolytic cell has in its center a tubular positive electrode (anode) which can be opened (preferably slotted) in the longitudinal direction in order to facilitate the removal of the gases produced. This tubular positive electrode is preferably surrounded by a porous membrane, which can consist of an electrically non-conducting material as for example of any suitable plastics, a textile fabric, a glass fiber fabric or the like and is also surrounded by a grid tube, which an also consist of an electrically non-conducting material as for example plastics or glass, ceramic material or the like. Owing to this grid tube the electrolytic cell is divided up into an anode compartment with the tubular positive electrode arranged in it and into a cathode compartment with the electrodes arranged radially in it (which for their part can be connected so as to be positive or negative). The anode compartment can be provided at its upper end or at both ends with an opening with a variable or adjustable size. Instead of the grid tube it is also possible to provide an impermeable plastic tube, in which no electrode is placed and which can be open or closed at the top and the bottom.

The electrodes arranged in the cathode compartment of the electrolytic cell in a radial direction with respect to the center of the electrolytic cell preferably have the form of thin rectangular plates, which are inserted between the two grids below the two conical lids closing the electrolytic cells and can be made of aluminum, iron, copper, silver, platinum or tantalum. In this connection it is to be point out that the expressions used here "platinum electrdode" and "tantalum electrode" are not to be taken to mean only electrodes which consist of solid platinum or solid tantalum respectively and also include electrodes which consist of platinum-plated titanium and tantalum-plated titanium respectively. The tubular positive electrode arranged in the center of the cell, which is always connected as the anode, always consists of platinum or platinum-plated titanium or of tantalum or tantalum-plated titanium.

If the radially outer electrodes consist of platinum or titanium, they can be mechanically protected if desired against impingement of the particles located in the electrolytic cell with a porous membrane of the same material as the membrane arranged in the center, which surrounds the anode.

The housing of the electrolytic cell can have any desired shape and it is preferably tubular and consists of an electrically non-conducting material, that is to say preferably plastics, glass, ceramic material or any other suitable material. The housing is preferably transparent so that the fluidized particles in it and the condition of the electrodes can be observed and checked during the course of electrolysis. Furthermore, the contact ring between the housing of the electrolytic cell and the upper of the lower lid, into which the contacts or spring contacts, which preferably consists of titanium, are directly molded if required, can also be transparent in order to be able to observe continuously the particles thrown up in the interior of the electrolytic cell and the condition of the electrodes.

At this juncture it is to be pointed out that the electrodes loaded in the cathode compartment of the electrolytic cell are extremely regularly consumed owing to the arrangements in accordance with the invention by continuous changing of the polarity of the electrodes at time intervals of at least 40 seconds and extending up to some hours, their complete consumption being indicated not only visually on inspection but also by a sudden increase in the electrolytic voltage, which can if desired to be arranged to be accompanied by a suitable obtical or acoustic signal so that it is made clear to the operating personnel that the electrodes must be renewed.

The interior space of the electrolytic cell is filled preferably for ⅓ to ¾, and more particularly for one half with particles which can have any desired shape and however are preferably spherical or substantially spherical and whose size can vary between 0.5 and 10 mm and whose density is greater than the density of water and preferably lies within the range of 1.1 to 4.0 g per cc. The quantity of the particles comprised in the interior of the electrolytic cell can also be outside the above-mentioned range.

In the case of the particles used in accordance with the invention, preferably spheres, it is a question of any desired particles whose size in density can very within the above-mentioned ranges and preferably consist of glass, $Al_2O_3$, ceramic material, and more particularly porcelain, plastics or an ionic exchange of resin. The particles or spheres are preferably porous and they have a porosity of preferably 10 to 30%, the pores of the porous particles being empty or partly or completely filled by an ion exchanger resin.

The particles located in the interior of the electrolytic cell are fluidized and caused to be by the water supply passed in with a sufficient speed of flow so that a fluidised bed or eddying bed is maintained as long as the water is supplied with a speed of flow sufficient in this respect. The size and density of the particles are so selected with respect to each other that sufficient fluidization is achieved. Owing to the kinetic energy imparted to the particles as a result the latter impinge on the surface of the radially outer electrodes or rub against them and thus ensure mechanically the keeping clean of the electrodes during the performance of the electrolytic process. In order to prevent damage due to impinging balls in the case of the use of sensitive platinum or tantalum electrodes it is convenient to protect the latter with a porous membrane. In order to ensure that the fluidized particles do not escape from the electrolytic cell, in front of the lower inlet opening and in front of the upper outlet opening for the water to be treated gratings are provided, whose grating opening size is less than the diameter of the particles or spheres located in the interior of the electrolytic cell. If in the center of the electrolytic cell a tubular positive electrode is arranged, the latter can, as mentioned above, also be protected by a grid tube against mechanical impringement of the particles.

As ion exchanger resins which completely or partly fill the pores of the particles in the interior of the electrolytic cell, and preferably of spherical shape, or can form the particles themselves, it is possible to use any desired ion exchanger resin, use being made preferably of strongly acidic sulfonated polystyrenes (for example Amberlite, Permutit RS-90 GG) or strongly basic polystyrenes of the trimethylbenzylammonium type (for example Dowex, Amberlite and the like). Suitable ion exchanger resins are described for example in Chemical Engineers' Handbook, J. H. Perry, 4th edition, 1960, pages 16-6 to 16-7, especially table 16.3.

The electolytic cell in accordance with the invention can be used for the treatment of water, and more particularly for the purification and disinfection of small and large swimming pools, for preparing drinking water for towns and small consumers and also for softening water down to any desired degree of hardness. It is furthermore possible to arrange several cells in accordance with the invention directly in tandem so that it becomes possible to carry out the above-mentioned methods of treatment simultaneously. Such a combined electrolytic cell can consist for example of a tube closed above and below by conical lids, in which one or more electrolytic cells in accordance with the invention can be arranged in any desired sequence with respectively two gratings between them and at least one device for the production of an electrical connection between the electrodes arranged in the interior and the external current source. The external tube can also be interrupted by rings, into which the contacts or spring pressure contacts can be molded in so that it becomes possible to supply current to the electrodes arranged in the interior. Furthermore, between the gratings a distance or spacing tube of any desired breadth can if desired be arranged between the gratings.

LIST OF SEVERAL VIEWS OF DRAWINGS

The invention will now be described with reference to some preferred embodiments as represented in FIGS. 1 to 5 of the accompanying drawings without however intending any limitation to the specific forms.

Figure 3:
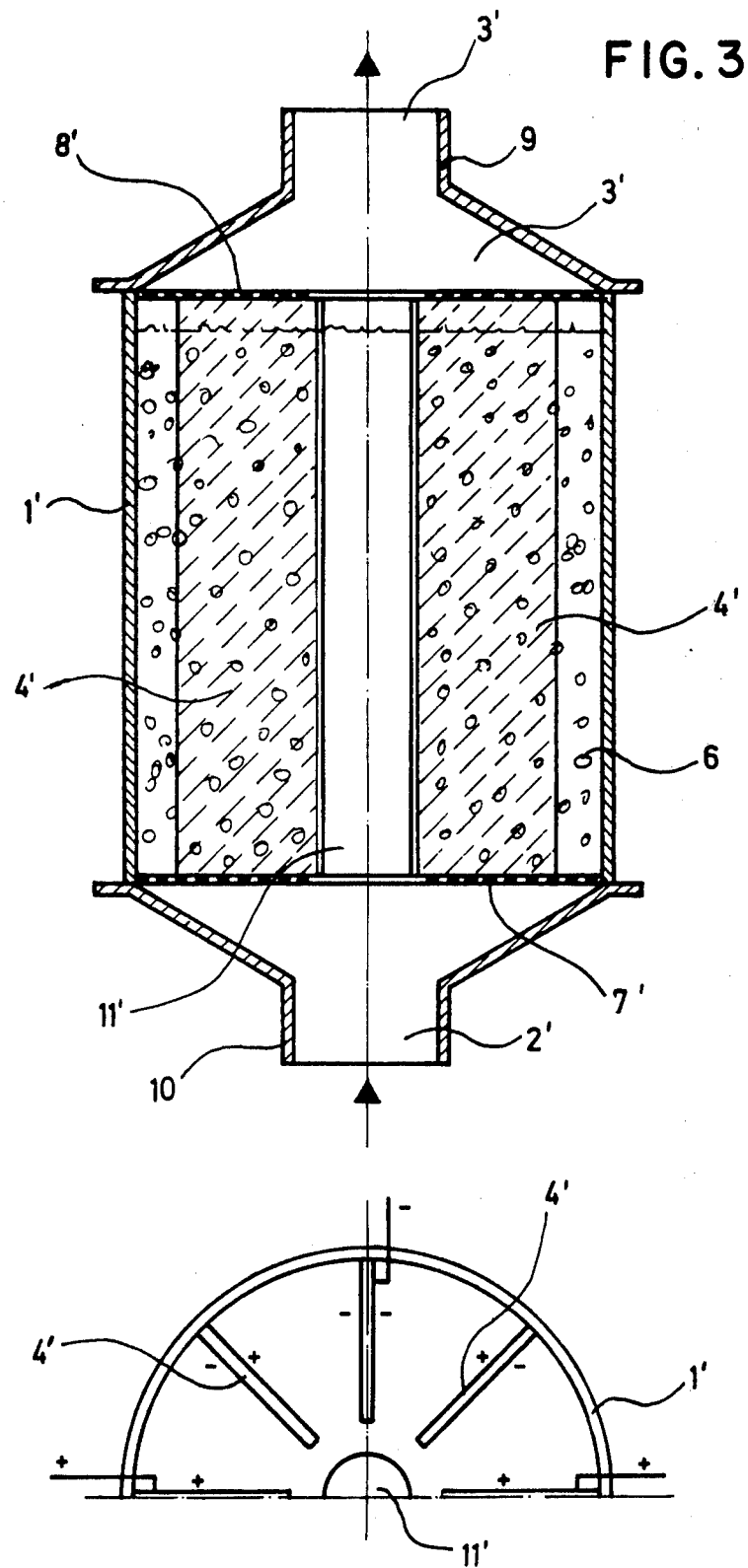
Figure 4:
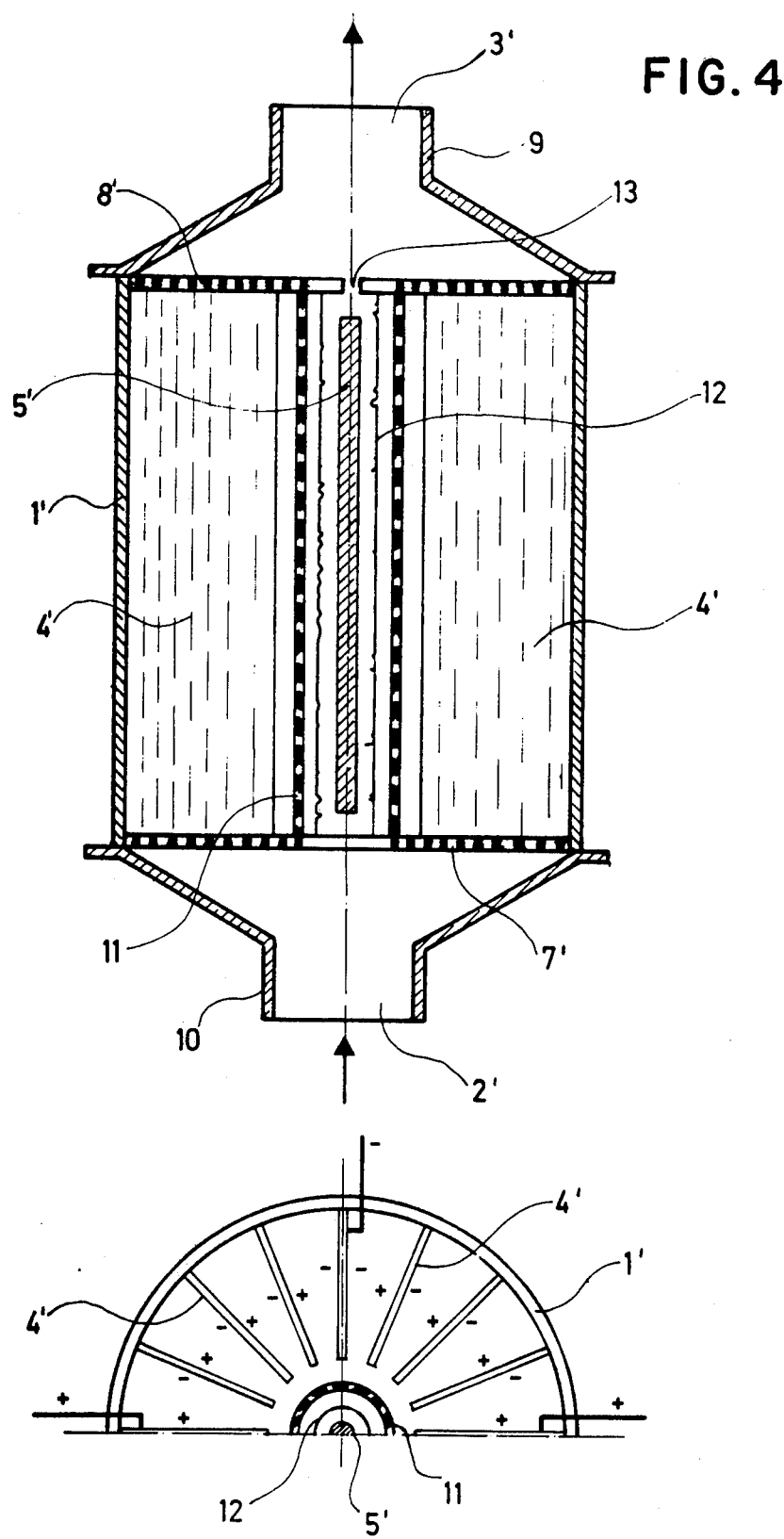
Figure 5:
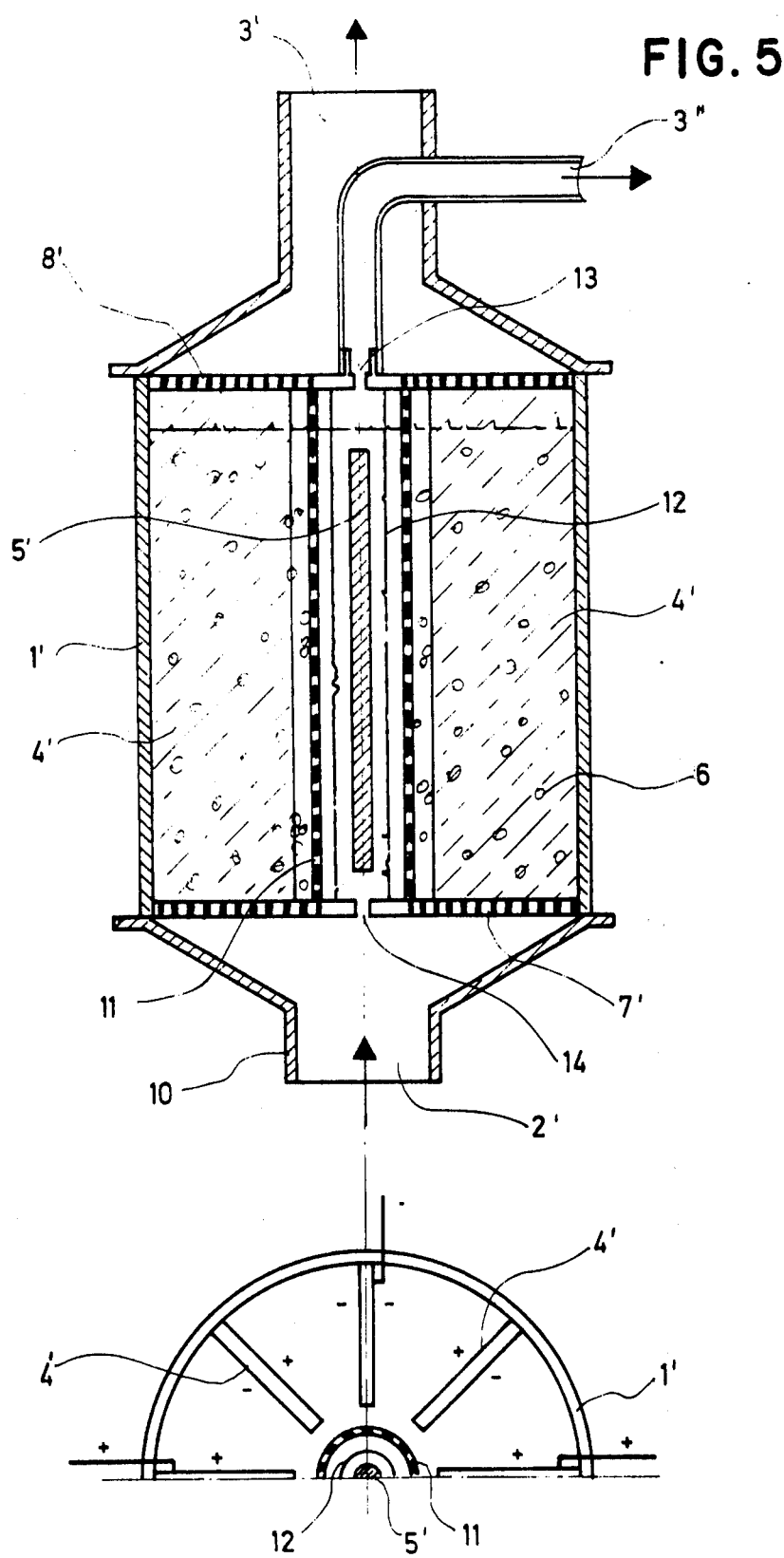

FIGS. 3 to 5 show preferred embodiments of the electrolytic cell in accordance with the invention in a diagrammatic form for the removal of contaminating materials dissolved and suspended in water, for the disinfection of chloride-containing or chloride-free water with the formation of chloride or per-compounds and, respectively, for the partial or complete removal of temporary hardness (lime hardness) from water in the given sequence.

DESCRIPTION OF PREFERRED EMBODIMENTS

Figure 1:
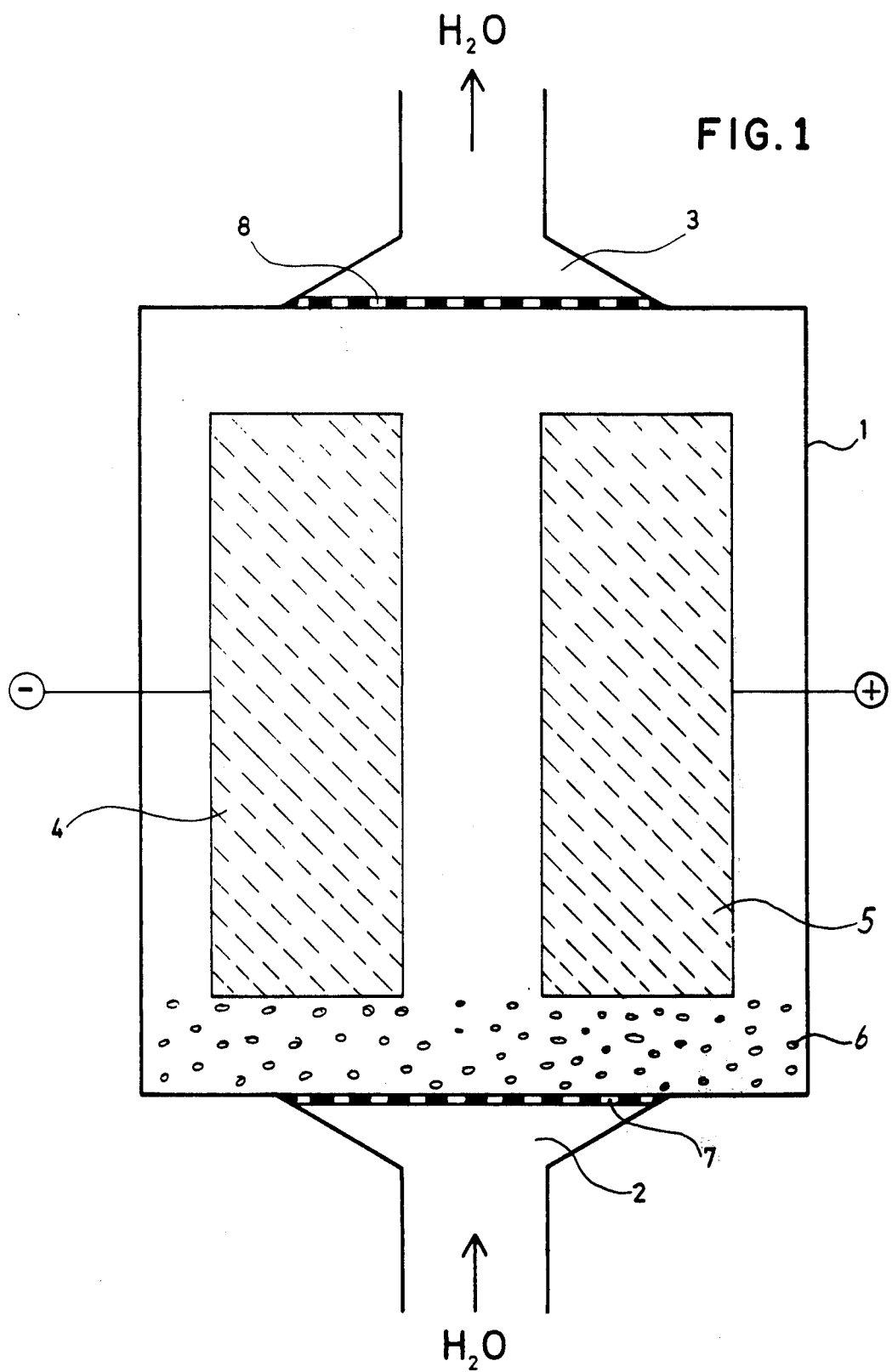
FIG. 1 shows a general embodiment of the electrolytic cell in accordance with the invention diagrammatically.

FIG. 1 shows a diagrammatic view of the electrolytic cell in accordance with the invention consisting of the container 1 with lower inlet opening 2 for the supplied water and an upper outlet opening 3 for the removed water in the case of which a grating 7 and 8 respectively is placed in front of the two openings and which ensures that particles 6 located in the interior of the cell cannot emerge from the electrolytic cell. In the interior of the electrolytic cell besides the above-mentioned particles 6 there are at least two electrodes 4 and 5, which can be connected with the positive and negative pole of an external DC source. The particles 6 located in the interior of the cell are thrown up and caused to perform eddying movements by the water flowing in through the opening 2 and are held in a suspended condition with the formation of a fluidised bed or a fluidised layer as long as the water is caused to flow through the cell with a sufficient velocity.

Figure 2:
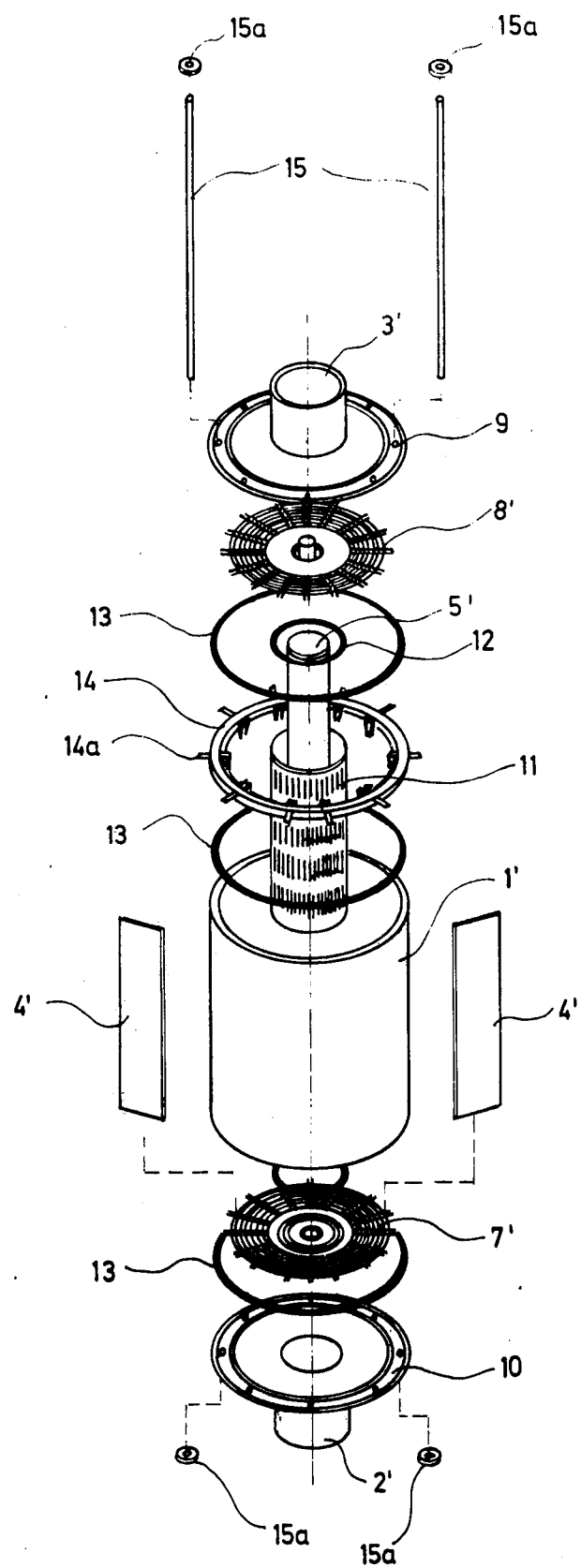
FIG. 2 shows a preferred embodiment of the electrolytic cell in accordance with the invention with all technical details regarding operation.

FIG. 2 of the accompanying drawings shows a preferred embodiment of the invention intended for commercial application in the case of which a cylindrical container 1' is closed above and below by a respective conical lid 9 and 10 respectively, preferably using screw bolts 15 and 15a. Between the upper and the lower lids and the tubular container there is respectively a grating 7', 8' respectively embedded between seals 13. The gratings are connected in the middle by a tube or a tubular form of a grid 11, which sets the distance between the two gratings into which the radially outer electrodes 4' can be inserted in the manner indicated. The tube or tube in the form of a grid 11 located in the interior of the electrolytic cell can be empty or can enclose a preferably inwardly opened tubular electrode (anode) 5', which is preferably surrounded by a porous membrane 12. Between the upper conical lid 9 and the tubular container 1' or between the lower conical lid 10 and the tubular container 1' a contact ring 14 may be arranged, in which the contacts or, respectively, spring pressure contacts 14a, preferably made of titanium, are directly molded and with whose help it is possible to produce an electrical connection between the electrodes arranged in the interior and the external current source.

In FIG. 3 of the accompanying drawings an embodiment of the electrolytic cell of the invention is represented, which is suitable for the flocculation removal of contaminants dissolved or suspended in the water to be treated, and/or for the disinfection of the water to be purified by means of silver ions (or copper ions).

In the case of this embodiment of the invention in the electrolytic cell only radially outer electrodes 4' are provided which consist of aluminum or ion or, respectively, siler (copper). In the center of the electrolytic cell 1' a platics tube 11' is provided which is open at both ends or is closed at the ends and which serves as a distance piece or tube. The electrodes 4' do not need to consist all of the same material. Thus, it is for example possible to use in addition to aluminum or iron electrodes simultaneously one or more silver electrodes (or copper electrodes) in order to produce not only a removal by flocculation of the undesired contaminating materials but also simultaneously a disinfection of the water by introduction of silver ions (or copper ions) into it. The electrodes, whose number can preferably amount to 2 to 16, can be connected in parallel or in series. Preferably they are connected in the manner indicated in FIG. 3. In order to obtain an even consumption of the electrodes they are reversed in polarity within the cell at regular intervals, preferably amounting to between 40 seconds and several hours. This reversal in polarity is however not absolutely necessary.

The cell represented in FIG. 3 and serving for removal of materials by flocculation or subjecting the water to the action of silver is operated by the introduction of water through the opening 2' with a sufficient speed as it moves past the radially arranged electrodes 4' so that its throws up the particles 6 arranged within the electrolytic cell 1' and after this leaves the electrolytic cell again at 3'. During the passage through the electrolytic cell 1' the electrodes 4', if they consist of aluminum or iron, are consumed under the electrolytic conditions and aluminum ions or iron ions are discharged into the water passing through the cell. These ions lead to the precipitation of aluminum hydroxide or, respectively, iron hydroxide, which entrains the undesired dissolved or suspended contaminating materials by adsorption and/or inclusion.

The electrodes 4' consisting of silver are consumed under these conditions with the formation of silver ions, which kill the micro-organisms comprised in the water flowing through the cell.

In the case of the embodiment of the invention shown in FIG. 4 it is a question of a cell which is suitable for the chlorination or peroxidation of the water to be treated. In this case the outer radial electrodes 4' can consist of aluminum, iron, platinum or tantalum. In the center of the electrolytic cell there is a tubular positive electrode 5', which is open in an inward direction in the longitudinal direction and is preferably provided with a longitudinal slot, consisting of platinum or tantalum and which is surrounded concentrically by a porous plastics membrane 12 and a grid tube 11. The grid tube can consist of plastics, as for example polyvinyl chloride, glass, ceramic material or any other suitable electrically insulated material, as for example porcelain. It serves not only as protection against the impingement of particles thrown up in the cathode compartment but also as a distance piece and it delimits the anode compartment of the electrolytic cell.

The membrane 12 surrounding the tubular positive electrode (anode) 5' can consist of any suitable electrically insulated material, as for example cellophane, polyvinyl chloride or any other microporous material as is used conventionally in dialysis. Preferably it is a question in this respect of conventional cellophane dialysis tube as is used for the filtration of bacteria.

The anode compartment, delimited by the grid tube 11, of the electrolytic cell has an opening 13 on the top with an adjustable diameter, through which the gas produced in it can escape.

If both the central inner tubular positive electrode 5' (anode) and also the outer radial electrodes 4' consist of platinum or tantalum, a sufficient action can be obtained by a reversal in polarity for a short time and at regular intervals of the radially outer electrodes 4' and in this case the particles 6 can be omitted in the electrolytic cell 1', although in this case it is advantageous to provide particles 6 within the electrolytic cell because such particles, as mentioned above, also improve the electrical conductivity of the water to be treated.

The electrolytic cell represented in FIG. 4 operates in such a manner that the water supplied with a sufficient speed through the opening 2' flows past the electrodes 4' arranged in the cathode compartment and on doing this it fluidizes the particles 6 at this position and then it leaves the cell through the opening 3' again. The chloride ions (generally present in a quantity of 5 to 40 ppm) present in the water normally pass through the porous membrane 12 to the positive electrode (anode) 5' in the anode part and accumulate in the case of a corresponding reduction in size of the upper opening 13 in the anode compartment to such a degree that elementary chlorine is evolved which disinfects the water to be treated in the anode compartment and the main current from the cathode compartment after combination with the flow from the anode compartment. If the water to be treated does not comprise any chloride ions or comprises less than 3 ppm chloride ions, nascent oxygen is produced in the anode compartment instead of elementary chlorine and this oxygen reacts with the other ions and molecules present with the formation of per-compounds (for example percarbonates, per-sulfates, hydrogen peroxide and the like) which also represents an extremely effective disinfectant for the water to be treated (and also an effective oxidising agent for any organic material which may be presented in the water).

If the electrodes 4' arranged in the cathode compartment consist of iron or aluminum, the reactions described above with reference to FIG. 3 occur.

The water softening cell represented in FIG. 5 is in principle of the same construction as the chlorination cell shown in FIG. 4 and it only differs from it in that the anode compartment arranged in the center has a respective opening 13, 14 at each of its ends. The two openings can be the same in size or different in size and can have an adjustable diameter. By suitable adaptation of the two openings 13, 14 to suit each other the speed of flow of the water within the anode compartment can be set at the desired value. A further difference between this arrangement and the chlorination cell shown in FIG. 4 resides in that the water flow 3" is removed separately from the water flow 3" leaving the cathode compartment. The two flows are brought together at a later point in time after the lime precipitated in the cathode water flow has been filtered off.

The outer radial electrodes 4' used in this electrolytic cell can onsist of copper, aluminum, iron, platinum or tantalum. The tubular central inner electrode (anode 5') consists of platinum or tantalum.

In operation the water supplied through the opening 2' passes through the anode compartment and the cathode compartment of the electrolytic cell 1'. The part of the water flow passing through the cathode compartment fluidizes the particles 6 in this compartment. The water leaves the cell again in the form of two separate flows 3', 3".

In the cathode compartment a pH-value of approximately 10 to approximately 11 obtains which ensures that the contaminating materials in the water, as for example calcium carbonate (responsible for the temporary hardness) are removed by precipitation.

In the anode compartment it is possible to ensure by a suitable adjustment of the openings 13, 14 that the water flow speed flow through the cell is so reduced that the chloride ions comprised in the water enrich in it until elementary chloride is produced or, respectively, until nascent oxygen is produced, if no chloride ions or less than 3 ppm chloride ions are present in the water to be treated.

After precipitates contained in the water flow 3' leaving the cathode compartment have been removed by suitable filters, this flow can be combined again with the water flow 3" leaving the anode compartment with the formation of purified water with the desired pH-value. By setting the mixing ratios the softening can be carried out down to any desired degree of hardness.

The invention has been explained above with reference to preferred embodiments. It is however quite obvious to a man in the art that it is in no way limited to such embodiments and that it can be modified and changed in many respects without leaving the scope of the claims defined in the invention.

In the accompanying drawings like parts are denoted by like reference numerals.

I claim:

1. A continuous process for the treatment of water which comprises passing a stream of water to be treated upwardly through and past electrodes of an electrolytic cell containing particles whose density is higher than that of the water, controlling the speed of said stream to form a fluidized bed of said particles and mechanically maintaining clean said electrodes of said cell by means of the kinetic energy generated from the fluidization of said particles.

* * * * *